T. BOSSHARD.
CONFECTION MAKING APPARATUS.
APPLICATION FILED NOV. 14, 1919.
1,338,354.
Patented Apr. 27, 1920.
2 SHEETS—SHEET 1.
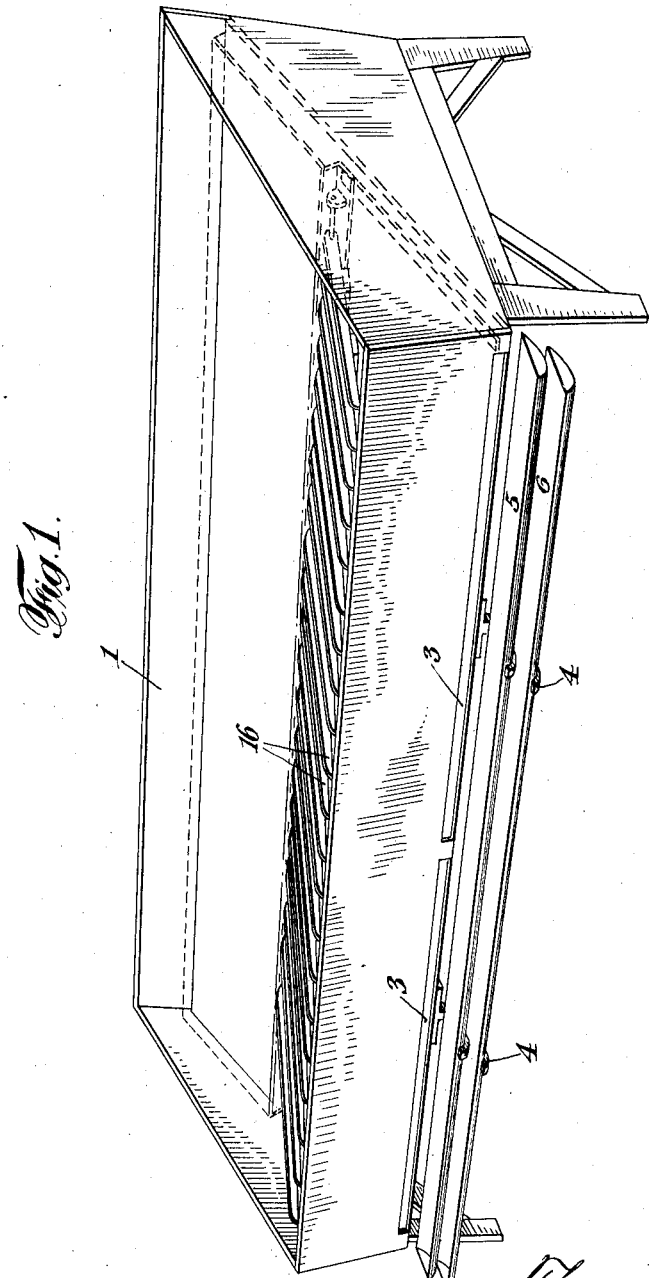

T. BOSSHARD.
CONFECTION MAKING APPARATUS.
APPLICATION FILED NOV. 14, 1919.
1,338,354.
Patented Apr. 27, 1920.
2 SHEETS—SHEET 2.
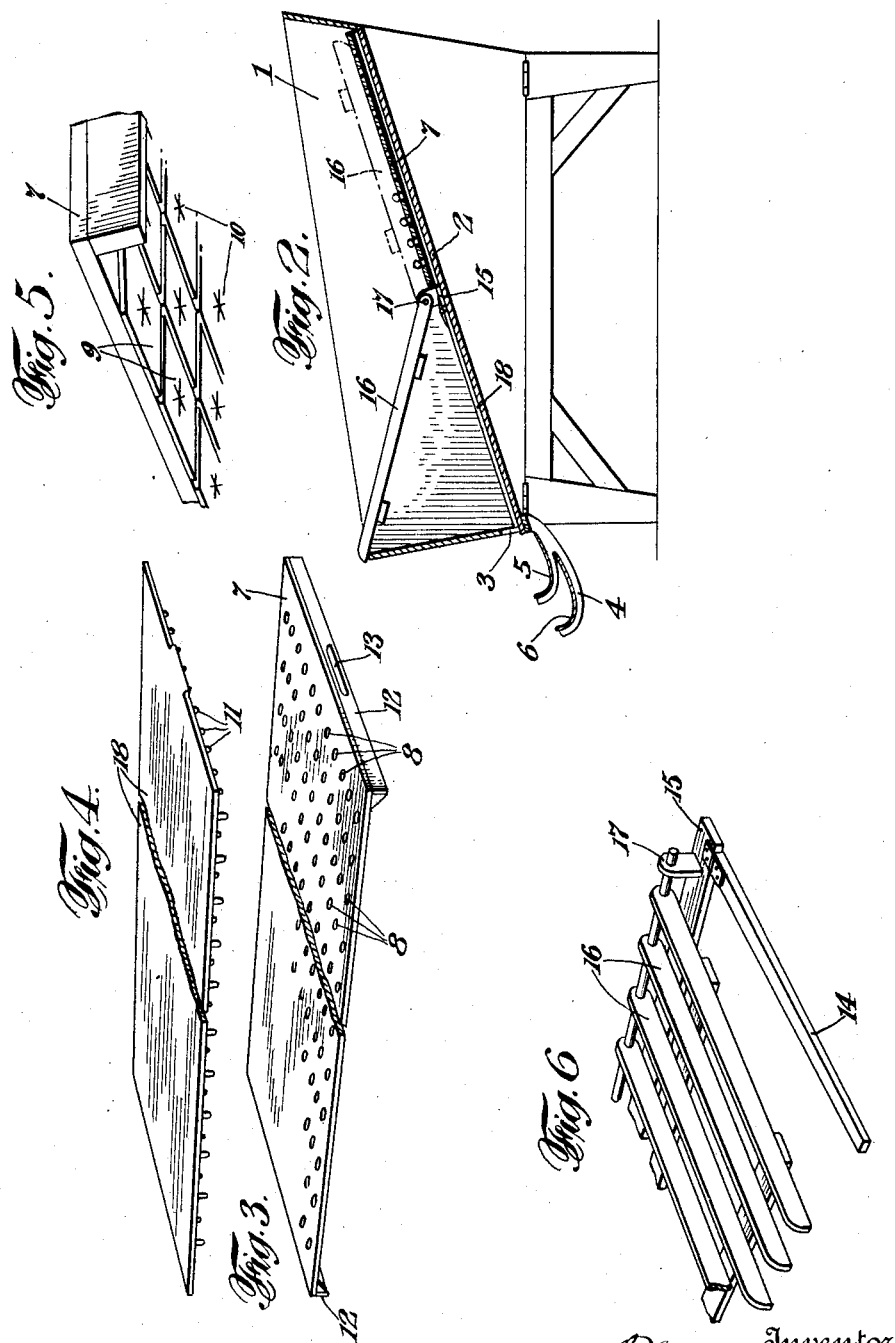

UNITED STATES PATENT OFFICE.

THEODORE BOSSHARD, OF BROOKLYN, NEW YORK.

CONFECTION-MAKING APPARATUS.

1,338,354.  Specification of Letters Patent.  Patented Apr. 27, 1920.

Application filed November 14, 1919. Serial No. 337,968.

*To all whom it may concern:*

Be it known that I, THEODORE BOSSHARD, a citizen of the United States, residing at 385 Cornelia street, borough of Brooklyn, New York city, county of Kings, and State of New York, have invented a certain new and useful Improvement in Confection-Making Apparatus, of which the following is a specification.

My invention relates to apparatus for use in the manufacture of confectionery, especially confectionery which is made by coating nuts, cherries, and other fruit, etc. It is especially adapted for use in coating cherries.

The object of my invention is to enable the nuts, cherries, fruit, etc., to be coated, to be held independently of each other and to facilitate placing them in the position to receive the coating.

In the drawings, Figure 1 is a perspective view;

Fig. 2 a cross-section of Fig. 1;

Fig. 3 is the tray to receive the articles to be coated;

Fig. 4 is the apparatus for removing the articles from the tray;

Fig. 5 is an enlarged detail of the tray;

Fig. 6 are the guides or brackets.

In the drawings in which like figures relate to like parts, 1 is a receptacle provided with an inclined bottom 2. At the lowest point where the bottom 2 joins the side of the receptacle is arranged an opening 3. Just outside the receptacle and adjacent to this opening are arranged brackets 4 adapted to hold trays 5 and 6. A tray, 7, is provided, having a plurality of passages 8, 8 through it. These passages are preferably just a little larger than the article, which is to form the meat of the confection. Arranged on the bottom of this tray are a plurality of flexible closures, 9, for the passages. I have shown one separate flexible closure for each passage, although as many closures could be made from one sheet of material as desired. I prefer to have each closure made of a separate piece of sheet rubber or similar flexible material so as to facilitate repairs, changes, etc. These closures, 9, are provided with slits, 10, radiating from a common center under the passage, 8, so that as pressure is brought to bear on the meat in the passage, it presses the flexible material separating the points formed by the radiating slits and permits the meat to drop out. Then the flexible material returns to its normal position closing the passage. To remove the meats from the passages, 8, 8, I provide a board having a series of plungers, 11, 11 (see Fig. 4), one for each passage 8, 8, and arranged to register with the passages 8, 8, so that when this board is placed upon the tray, each of the plungers 11, 11, enters the adjacent passage 8, 8, and presses the meat out through the closure 9. The tray, 7, is provided with supports 12, 12, to raise it above the foundation upon which it is placed the required distance to permit ready opening and closing of the passages 8, 8, by the closures 9, 9. Handles, 13, are provided for the tray, 7.

When the tray, 7, is placed upon the inclined bottom of the receptacle 2, it is held in place along the upper portion of the bottom by supports, 14, which rest one end against the side of the receptacle and the other end is hinged to a longitudinal support, member 15, against which the tray, 7, rests. Hinged to this member 15 are a series of guides, 16, 16, by hinge 17. These guides are arranged so that when in use they rest upon the tray, 7, one of the guides between each line of the passages. The guides, 16, being in place as shown in dotted lines in Fig. 2, the cherries or other meats are deposited into the receptacle and guided by guides 16, 16 are deposited into the passages 8, 8. The meats not deposited slide down the inclined bottom out through the opening, 3, into the trays 5 and 6, ready to be put back into the receptacle when the next tray is put in. The guides, 16, 16, are now thrown back to the position shown in Fig. 2. The tray, 7, is removed and placed in position over the material in which it is desired to place the meat. Then the plunger board, 18, having plungers 11, 11, is placed upon the tray, and removes the meat from the passages 8, 8 to the place desired. The plunger board now being removed permits the tray passages, 8, 8, to be closed by the closures, 9, 9, ready to be returned to the receptacle, and the operation repeated as many times as is desired.

Having described my invention, what I claim as new and desire to secure by Letters Patent is:

1. In a confection-making apparatus, a member provided with a passage to receive the article to be coated, a flexible closure for said passage provided with an opening therein normally closed.

2. In a confection-making apparatus, a receptacle provided with an inclined bottom, a tray for said receptacle provided with passages to receive the article to be coated, a closure for said passages normally closed, a tray arranged to receive the surplus articles not deposited in the passages.

3. In a confection-making apparatus, a receptacle provided with an inclined bottom, a tray for said receptacle provided with passages to receive the article to be coated, a closure for said passages normally closed, an opening in said receptacle to permit passage of the surplus articles, and a tray arranged to receive the surplus articles not deposited in the passages.

4. In an apparatus of the character described, a receptacle, an inclined bottom therein, a removable tray provided with passages to receive articles to be treated, closures for said passages, guides to guide articles to said passages, and a tray to receive the surplus articles.

5. In an apparatus of the character described, a receptacle, an inclined bottom therein, a removable tray provided with passages to receive articles to be treated, closures for said passages, removable guides to guide articles to said passages, and a tray to receive the surplus articles.

6. In an apparatus of the character described, a receptacle, an inclined bottom therein, a removable tray provided with passages to receive articles to be treated, closures for said passages, removable guides to guide articles to said passages, and a tray to receive the surplus articles arranged adjacent the lowest portion of said bottom, and on the exterior of said receptacle, an opening in the said receptacle to permit passage of the surplus articles to the last-mentioned tray.

7. In an apparatus of the character described, a receptacle, an inclined bottom therein, a removable tray provided with passages to receive articles to be treated, closures for said passages, guides to guide articles to said passages, and a tray to receive the surplus articles and means for removing the articles from the passages.

In testimony whereof I have signed my name to this specification.

THEODORE BOSSHARD.